United States Patent
Nojima et al.

(10) Patent No.: US 8,655,553 B2
(45) Date of Patent: Feb. 18, 2014

(54) MONITORING SYSTEM AND METHOD FOR ELECTRIC VEHICLE AND ELECTRIC VEHICLE SUPPLY EQUIPMENT

(75) Inventors: Geraldo Nojima, Asheville, NC (US); William E. Wilkie, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 183 days.

(21) Appl. No.: 13/292,310

(22) Filed: Nov. 9, 2011

(65) Prior Publication Data

US 2013/0116886 A1 May 9, 2013

(51) Int. Cl.
*G06F 7/00* (2006.01)

(52) U.S. Cl.
USPC ......... 701/49; 180/65.1; 180/65.23; 180/165; 60/650; 60/659; 60/682; 363/37; 363/118; 363/175; 292/201; 292/216; 320/109; 320/128; 903/916; 307/10.1

(58) Field of Classification Search
USPC .................. 701/34, 49; 180/65.1, 65.23, 165; 60/650, 659, 682; 363/37, 118, 175; 292/201, 216; 320/109, 128; 903/916; 307/10.1
See application file for complete search history.

(56) References Cited

U.S. PATENT DOCUMENTS

| | | | | |
|---|---|---|---|---|
| 5,586,613 A * | 12/1996 | Ehsani | ................. | 180/65.23 |
| 7,859,223 B2 * | 12/2010 | Gorbold | ................. | 320/119 |
| 2009/0040029 A1 * | 2/2009 | Bridges et al. | ........... | 340/310.11 |
| 2009/0139781 A1 * | 6/2009 | Straubel | ................. | 180/65.1 |
| 2009/0200988 A1 * | 8/2009 | Bridges et al. | ................. | 320/137 |
| 2011/0082598 A1 * | 4/2011 | Boretto et al. | ................. | 700/291 |
| 2011/0225105 A1 * | 9/2011 | Scholer et al. | ................. | 705/412 |
| 2012/0130891 A1 * | 5/2012 | Bogaard et al. | ................. | 705/40 |
| 2012/0299531 A1 * | 11/2012 | Prosser et al. | ................. | 320/104 |
| 2012/0299544 A1 * | 11/2012 | Prosser et al. | ................. | 320/109 |
| 2012/0303213 A1 * | 11/2012 | Prosser et al. | ................. | 701/36 |
| 2012/0303259 A1 * | 11/2012 | Prosser | ................. | 701/400 |
| 2012/0303397 A1 * | 11/2012 | Prosser | ................. | 705/7.12 |
| 2013/0015814 A1 * | 1/2013 | Kelty et al. | ................. | 320/109 |
| 2013/0158782 A1 * | 6/2013 | Bertness et al. | ................. | 701/34.4 |

* cited by examiner

*Primary Examiner* — McDieunel Marc
(74) *Attorney, Agent, or Firm* — Eckert Seamans Cherin & Mellott, LLC; Kirk D. Houser

(57) ABSTRACT

A monitoring system is for an electric vehicle and an electric vehicle supply equipment. The electric vehicle supply equipment is structured to communicate with the electric vehicle to charge the electric vehicle. The monitoring system includes a monitoring component structured to monitor communication and monitor energy or power flow between the electric vehicle supply equipment and the electric vehicle, a storage component cooperating with the monitoring component to store information corresponding to the monitored communication and the monitored energy or power flow between the electric vehicle supply equipment and the electric vehicle, and a power supply structured to power at least one of the monitoring component and the storage component.

20 Claims, 1 Drawing Sheet

MONITORING SYSTEM AND METHOD FOR ELECTRIC VEHICLE AND ELECTRIC VEHICLE SUPPLY EQUIPMENT

BACKGROUND

1. Field

The disclosed concept pertains generally to monitoring systems and, more particularly, to monitoring systems for electric vehicles and electric vehicle supply equipment.

2. Background Information

An electric vehicle (EV) charging station, also called an EV charging station, electric recharging point, charging point or EVSE (Electric Vehicle Supply Equipment) (hereinafter, EVSE or electric vehicle supply equipment), is an element in an infrastructure that supplies electric energy for the recharging of electric vehicles, plug-in hybrid electric-gasoline vehicles, or semi-static/mobile electrical units, such as exhibition stands.

An EVSE is a device that safely allows electricity to flow. Such EV charging stations and the protocols established to create them are known as EVSE, and they enhance safety by enabling two-way communication between the EV charging station and the EV.

The 1996 NEC and California Article 625 define EVSE as being the conductors, including the ungrounded, grounded, and equipment grounding conductors, the electric vehicle connectors, attachment plugs, and all other fittings, devices, power outlets or apparatuses installed specifically for the purpose of delivering energy from premises wiring to an electric vehicle.

Although the proliferation of EV charging systems has continuously increased, EVs are relatively young. With relatively large numbers of EVs, and with different manufacturers supplying EVs and EVSE, it is likely that problems may arise during the charging process that can range from nuisance problems to grave problems or even catastrophic problems. Because the charging process involves two separate entities, the EV and the EVSE, it may be difficult to determine what went wrong during a charging session, especially in the case of a meltdown failure or other catastrophic problem.

There is room for improvement in monitoring systems for electric vehicles and electric vehicle supply equipment.

There is also room for improvement in methods of monitoring electric vehicles and electric vehicle supply equipment.

SUMMARY

These needs and others are met by embodiments of the disclosed concept, which monitor communication and/or energy or power flow between electric vehicle supply equipment and an electric vehicle, and store information corresponding to the communication and/or the energy or power flow between the electric vehicle supply equipment and the electric vehicle.

In accordance with one aspect of the disclosed concept, a monitoring system is for an electric vehicle and an electric vehicle supply equipment, the electric vehicle supply equipment is structured to communicate with the electric vehicle to charge the electric vehicle. The monitoring system comprises: a monitoring component structured to monitor communication and monitor energy or power flow between the electric vehicle supply equipment and the electric vehicle; a storage component cooperating with the monitoring component to store information corresponding to the monitored communication and the monitored energy or power flow between the electric vehicle supply equipment and the electric vehicle; and a power supply structured to power at least one of the monitoring component and the storage component.

The monitoring component may be further structured to time-stamp events corresponding to the monitored communication and the monitored energy or power flow between the electric vehicle supply equipment and the electric vehicle, and to store the time-stamped events in the storage component.

The monitoring component may be further structured to output a sequence of events of the time-stamped events from the storage component.

As another aspect of the disclosed concept, a method of monitoring an electric vehicle and an electric vehicle supply equipment structured to communicate with the electric vehicle to charge the electric vehicle, comprises: monitoring with a processor at least one of communication and energy or power flow between the electric vehicle supply equipment and the electric vehicle; and storing information corresponding to the at least one of the communication and the energy or power flow between the electric vehicle supply equipment and the electric vehicle.

The method may further comprise time-stamping events corresponding to the communication and the energy or power flow between the electric vehicle supply equipment and the electric vehicle; and storing the time-stamped events.

The method may further comprise outputting a sequence of events of the stored time-stamped events.

The method may include with the stored information sensed current flowing between the electric vehicle supply equipment and the electric vehicle, sensed voltage output from the electric vehicle supply equipment to the electric vehicle, sensed current flowing to the electric vehicle supply equipment from a power source, and sensed voltage to the electric vehicle supply equipment from the power source.

The method may include with the stored information communication commands from the electric vehicle to the electric vehicle supply equipment, and communication responses from the electric vehicle supply equipment to the electric vehicle.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a digital signal processor (DSP); or any suitable processing device or apparatus.

As employed herein, the term "electrical conductor" shall mean a wire (e.g., solid; stranded; insulated; non-insulated), a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "vehicle" shall expressly include, but not be limited by, a land vehicle, a marine vehicle, an air vehicle, spacecraft, or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, scooters, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the term "electric vehicle" or "electric drive vehicle" shall mean a vehicle that employs a number of electric motors or traction motors for propulsion. Non-limiting examples include plug-in electric vehicles, plug-in hybrid (e.g., without limitation, electric-gasoline) vehicles, and semi-static/mobile electrical units, such as exhibition stands. An electric vehicle typically includes an on-board rechargeable electricity storage system (RESS), such as a number of batteries.

Figure 1:
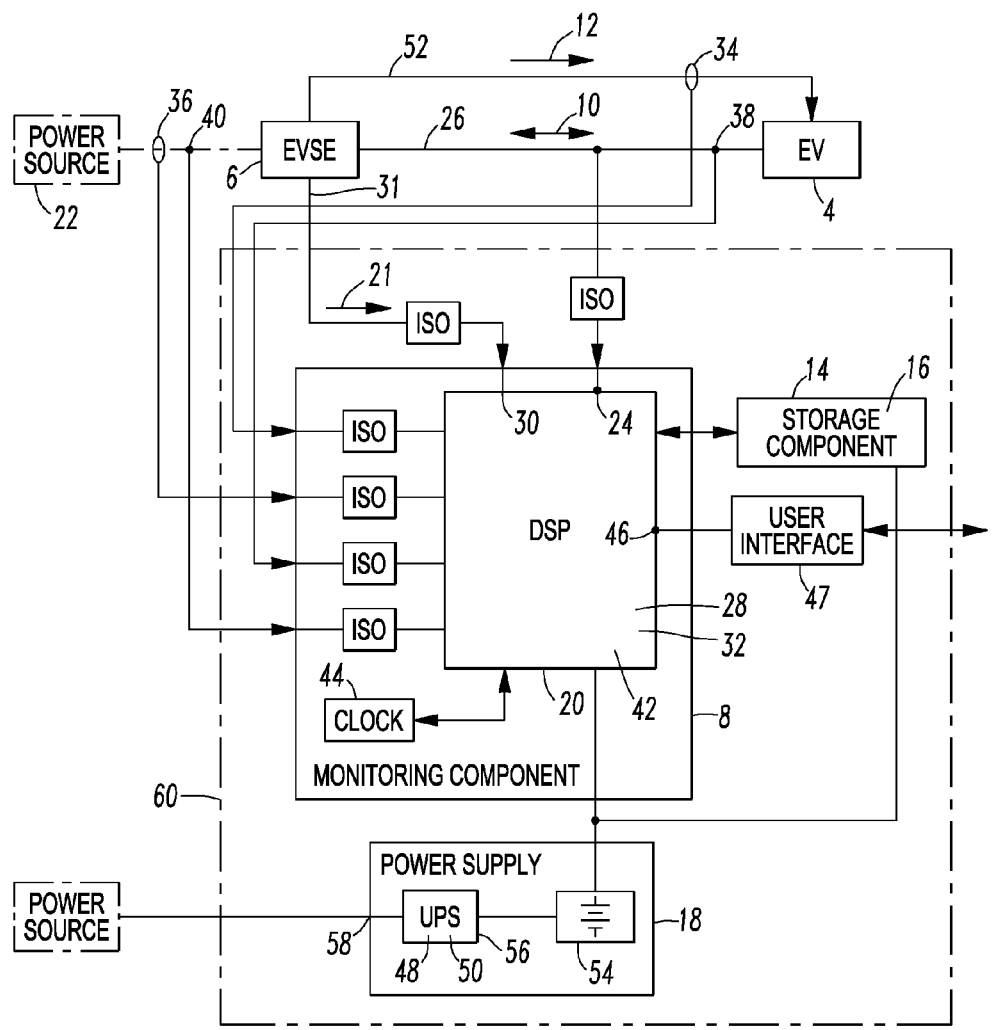
FIG. 1 is a block diagram of a monitoring system for an electric vehicle and electric vehicle supply equipment in accordance with embodiments of the disclosed concept.

Referring to FIG. 1, a monitoring system 2 is for an electric vehicle (EV) 4 and an electric vehicle supply equipment (EVSE) 6. The EVSE 6 is structured to communicate with the EV 4 to charge the EV 4. The monitoring system 2 includes a monitoring component 8 structured to monitor communication 10 and monitor energy or power flow 12 (e.g., without limitation, including voltage, current, power (e.g., current times voltage; kW) and/or energy (e.g., power integrated against time (kWh)) between the EVSE 6 and the EV 4, a storage component 14 cooperating with the monitoring component 8 to store information 16 corresponding to the monitored communication 10 and the monitored energy or power flow 12 between the EVSE 6 and the EV 4, and a power supply 18 structured to power at least one of the monitoring component 8 and the storage component 14.

EXAMPLE 1

The example monitoring system 2 is an independent monitoring system 2 (e.g., an independent third entity) that monitors the communication 10 and the energy or power flow 12 between the EV 4 and the EVSE 6. The monitoring system 2 includes the built-in power supply 18, logs all communication and energy or power flow between the EVSE 6 and the EV 4, and stores the information 16 in the storage component 14 (e.g., without limitation, a linear or circular digital memory buffer; any suitable storage device). In case of a fault, error or other problem, the monitoring system 2 continues to store the information 16 during and until a total shut down of the EV 4 and the EVSE 6. As will be discussed, the monitoring system 2 preferably provides time-stamps for timing of various events of the fault, error or other problem, thereby allowing a postmortem analysis of what occurred and the corresponding sequence of events.

The monitoring component 8 includes a suitable processor, such as the example DSP 20, which monitors: (1) the communication 10 between the EVSE 6 and the EV 4; (2) fault status 21 output by the EVSE 6; and (3) the energy or power flow 12 between the EVSE 6 and the EV 4. The example energy or power flow 12 includes, for example: (a) sensed direct current (DC) current flowing between the EVSE 6 and the EV 4 (normally flowing to the EV 4), (b) sensed DC voltage output from the EVSE 6 to the EV 4, (c) sensed alternating current (AC) current flowing to the EVSE 6 from a power source 22 (shown in phantom line drawing), and (d) sensed AC voltage output to the EVSE 6 from the power source 22.

The example DSP 20 includes a first communication interface 24 that listens to communications between the EVSE 6 and the EV 4 (e.g., without limitation, commands output by the EV 4, and responses to those commands output by the EVSE 6) on EV/EVSE communication bus 26. The DSP 20 also includes a first logger function 28 that stores this communications information in the storage component 14.

The DSP 20 further includes a second communication interface 30 that listens to the fault status 21 output by the EVSE 6 on EVSE communication bus 31. The DSP 20 also includes a second logger function 32 that stores this fault status information in the storage component 14.

The DSP 20 also includes two current sensors 34,36 and two voltage sensors 38,40 that respectively sense the DC current flowing between the EVSE 6 and the EV 4, the AC current flowing to the EVSE 6 from the power source 22, the DC voltage output from the EVSE 6 to the EV 4, and the AC voltage output to the EVSE 6 from the power source 22. The DSP 20 further includes a third logger function 42 that stores this energy or power flow information in the storage component 14.

EXAMPLE 2

Non-limiting examples of commands from the EV 4 to the EVSE 6 include commands to request information (e.g., charging current to the EV; DC voltage requested from the EV; kilowatt-hour (kWh) associated with the current charging session; fault codes from the EVSE); commands to start/stop charging; commands or messages to report state of charge of the EV battery; and commands or messages to report circuit readiness state (e.g., of relays; of other circuit components of the EV).

EXAMPLE 3

The DSP 20 includes the example sensors 34,36,38,40 to respectively monitor output DC current, input AC current, output DC voltage and input AC voltage with respect to the EVSE 6. These sensors are independent from the EVSE 6 and the EV 4.

EXAMPLE 4

Non-limiting examples of the fault status 21 (or fault codes) from the EVSE 6 include electrical circuit ground isolation fault, ground fault, EVSE over temperature, EV not ready, and improper connection between the EV and the EVSE.

EXAMPLE 5

Non-limiting examples of the DSP first communication interface 24, the EV/EVSE communication bus 26, the DSP second communication interface 30 and the EVSE communication bus 31 include any suitable non-intrusive data communication interface (e.g., without limitation, a controller-area network (CAN or CAN-bus); other suitable communication busses; PLCBUS or PLC-BUS; other suitable power-line communication physical and data protocols; other suitable protocols/communication interfaces) between EVSE and EV, or EVSE and another device.

EXAMPLE 6

The DSP 20 preferably includes a battery-backed clock, such as the example real-time clock 44. Whenever any of the DSP logger functions 28,32,42 stores an event in the storage component 14, it associates that event with a time stamp (or a time-date stamp) (e.g., without limitation, command to start charging at 8:23:14.7 pm; ground fault at 10:56:01.3 pm; command to stop charging at 12:42:27.4 am). Similarly, monitored energy or power flow can also be stored (e.g., without limitation, on a periodic basis; in response to a change greater than a predetermined value or predetermined percentage) with a time stamp (or a time-date stamp) (e.g., without limitation, 208.0 VAC at 8:24:00.0 pm; 50.0 amperes AC at 8:24:00.1 pm; 400.0 VDC at 8:24:00.2 pm; 40.53 amperes DC at 8:24:00.3 pm). In this manner, the monitoring component DSP 20 time-stamps events corresponding to the monitored communication and the monitored energy or power flow between the EVSE 6 and the EV 4, and stores the time-stamped events in the storage component 14. The independent monitoring system 2 is a repository for these time-stamped events in the event a catastrophic or other error condition occurs with one or more of the EVSE 6, the EV 4, the bus 26, the power circuit 52 and the power source 22.

EXAMPLE 7

The status output 46 of the DSP 20 is the stored data (preferably time-stamped as was discussed above in Example 6), which can be accessed (e.g., without limitation, via Ethernet; RS-232; TCP-IP; USB) via any suitable PC or other suitable user interface 47.

EXAMPLE 8

The storage component 14 can be any suitable storage device for storing information and other data. For time-stamping purposes, it can advantageously be implemented as a linear memory or a circular memory, although any suitable storage technology can be employed.

EXAMPLE 9

The status output 46 of the DSP 20 preferably outputs a sequence of events of the time-stamped events from the storage component 14, such that a user can advantageously review the time-stamped events corresponding to the monitored communication and the monitored energy or power flow between the EVSE 6 and the EV 4 to review or diagnose any nuisance problem, grave problem or catastrophic problem that might have arisen, for example, before, during or after a charging session.

EXAMPLE 10

The DSP logger functions 28,32,42 are preferably structured to continue to store the information 16 corresponding to the monitored communication and the monitored energy or power flow between the EVSE 6 and the EV 4 until a complete termination of the communication and the energy or power flow between the EVSE 6 and the EV 4. For example, a complete termination of the communication and/or the energy or power flow is determined by the example DSP 20, since both communication traffic, and relevant AC and DC voltages and currents are being monitored by the DSP 20. For example and without limitation, a suitable predetermined time-out period can be employed based upon the type of EVSE and the corresponding communication protocol. The DSP 20 monitors the commands to the EVSE 6 (e.g., without limitation, CHAdeMO (sometimes spelled CHAdeMO; CHAdeMO is an abbreviation of "CHArge de Move"; the trade name of a quick charging method for battery EVs delivering up to 62.5 kW of high-voltage direct current via a special electrical connector and is proposed as a global industry standard by an association of the same name) initiates charging and terminates charging via discrete messages. In addition to the communication data, the DSP 20 monitors independent power data in real time along with the messaging between the EV 4 and the EVSE 6. Monitoring by the DSP 20 can be either continuous or at discrete time intervals (e.g., without limitation, every 100 mS; any suitable time period) depending on user preference.

EXAMPLE 11

The monitoring component 8 and the monitoring system 2 are preferably independent of the EVSE 6 and the EV 4.

EXAMPLE 12

The power supply 18 is preferably structured to provide at least one of electromagnetic interference (EMI) protection 48 and surge protection 50.

EXAMPLE 13

The user interface 47, which can be part of (as shown) or separate from (not shown) the monitoring system 2, is structured to display the stored information from the storage component 14 as output by the DSP status output 46.

EXAMPLE 14

The DSP first communication interface 24 provides a control monitoring circuit structured to monitor inputs to the EVSE 6 and outputs from the EVSE 6. Non-limiting examples of inputs (commands) to the EVSE 6 and outputs (responses) from the EVSE 6 on the EV/EVSE communication bus 26 include: (1) a command to request charging current, and a response with the requested charging current; (2) a command to report battery voltage (if too low, the EVSE charger will not initiate the charging session; if too high, the EVSE charger will terminate the charging session); and (3) a command to report EVSE fault codes (if prior to a charging session, the EVSE charger will not initiate a charging session; if during a charging session, the EVSE charger will terminate the charging session).

EXAMPLE 15

The DSP first and second communication interfaces 24,30 and the example sensors 34,36,38,40 are preferably structured to isolate (ISO) the monitoring system 2 from the EVSE 6. Non-limiting examples of isolation (ISO) employed by the monitoring system 2 include electrical connections to the communication busses 26,31 and terminals interfacing with the EVSE/EV power circuit 52 are completed magnetically and are suitably electrically isolated (e.g., without limitation, optically coupled; sensed by Hall effect sensors).

EXAMPLE 16

Further to Example 15, the current sensor 34 structured to sense DC current flowing between the EVSE 6 and the EV 4, and the voltage sensor 38 structured to sense DC voltage output from the EVSE 6 to the EV 4 are both structured to isolate (ISO) the monitoring system 2 from the EVSE 6 and the EV 4.

EXAMPLE 17

The power supply 18 is preferably structured as an uninterruptible power supply (UPS). For example, the example power supply 18 includes a battery 54 that powers the monitoring component 8 and the storage component 14, and a UPS charging circuit 56 for the battery 54. The example UPS power supply 18 is independent of the power from the EVSE 6, the EVSE charger (not shown) and the EVSE/EV power circuit 52. For example, the DSP 20 is only powered by the battery 54 that is recharged from, for example, 120 VAC at power input 58 by the UPS charging circuit 56.

EXAMPLE 18

The power input 58 to the UPS charging circuit 56 is preferably independent from the EVSE 6 and the EV 4. For example, the UPS power supply 18 does not receive any power from the EVSE 6. The example 120 VAC power input 58 can be independently sourced (with respect to the VAC power to the EVSE 6) or can be tapped from an incoming power line with a step down transformer (not shown).

EXAMPLE 19

Figure 2:
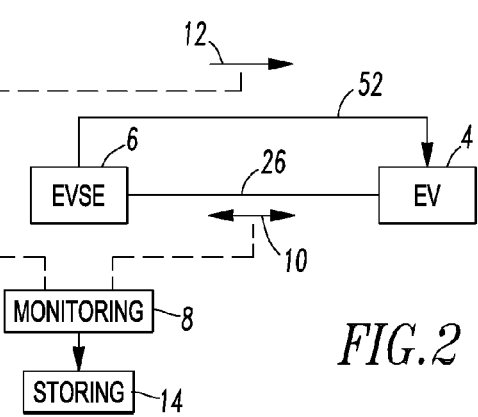
FIG. 2 is a block diagram of a monitoring and storing process in accordance with embodiments of the disclosed concept.

The disclosed concept provides a method of monitoring the EV 4 and the EVSE 6, which is structured to communicate with the EV 4 to charge the same, as shown in FIG. 2. This monitors, with the example DSP 20 of FIG. 1, at least one of communication 10 and energy or power flow 12 between the EVSE 6 and the EV 4, and stores information 16 corresponding to the at least one of the communication 10 and the energy or power flow 12 between the EVSE 6 and the EV 4.

The example DSP 20 time-stamps events corresponding to the communication 10 and the energy or power flow 12 between the EVSE 6 and the EV 4, and stores the time-stamped events in the example storage component 14. The example DSP 20 outputs a sequence of events of the stored time-stamped events at the DSP status output 46. Non-limiting examples of the stored information 16 include sensed current flowing between the EVSE 6 and the EV 4, sensed voltage output from the EVSE 6 to the EV 4, sensed current flowing to the EVSE 6 from the power source 22, sensed voltage to the EVSE 6 from the power source 22, communication commands from the EV 4 to the EVSE 6, and communication responses from the EVSE 6 to the EV 4.

EXAMPLE 20

The independent monitoring system 2 preferably includes a suitable housing 60 that provides, for example and without limitation, a level of protection against explosion, the environment and/or tampering.

EXAMPLE 21

The independent monitoring system 2 may advantageously be situated within the EVSE enclosure (not shown) or the EVSE charger enclosure (not shown), but have a minimal physical interface. For example and without limitation, this provides a degree of physical isolation. Specifically, if something catastrophic occurred in the charger, then the monitoring system has a degree of protection against effects from failures in the charger enclosure. The design of the enclosure that accommodates the monitoring hardware is preferably robust in nature in order to resist, for example and without limitation, fire and shock.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A monitoring system for an electric vehicle and an electric vehicle supply equipment, said electric vehicle supply equipment being structured to communicate with said electric vehicle to charge said electric vehicle, said monitoring system comprising:
    a monitoring component structured to monitor two-way communication between said electric vehicle supply equipment and said electric vehicle and monitor energy or power flow between said electric vehicle supply equipment and said electric vehicle;
    a storage component cooperating with said monitoring component to store information corresponding to said monitored two-way communication and said monitored energy or power flow between said electric vehicle supply equipment and said electric vehicle; and
    a power supply structured to power at least one of said monitoring component and said storage component.

2. The monitoring system of claim 1 wherein said monitoring component is further structured to time-stamp events corresponding to said monitored two-way communication and said monitored energy or power flow between said electric vehicle supply equipment and said electric vehicle, and to store said time-stamped events in said storage component.

3. The monitoring system of claim 2 wherein said monitoring component is further structured to output a sequence of events of said time-stamped events from said storage component.

4. The monitoring system of claim 1 wherein said monitoring component and said storage component are structured to continue to store said information corresponding to said monitored two-way communication and said monitored energy or power flow between said electric vehicle supply equipment and said electric vehicle until a complete termination of said two-way communication and said energy or power flow between said electric vehicle supply equipment and said electric vehicle.

5. The monitoring system of claim 1 wherein said storage component is a linear memory or a circular memory.

6. The monitoring system of claim 1 wherein said monitoring system is independent of said electric vehicle supply equipment and said electric vehicle.

7. The monitoring system of claim 1 wherein said power supply is structured to provide at least one of electromagnetic interference protection and surge protection.

8. The monitoring system of claim 1 wherein said monitoring component comprises a user interface structured to display said stored information.

9. The monitoring system of claim 1 wherein said monitoring component comprises a control monitoring circuit structured to monitor inputs to said electric vehicle supply equipment and outputs from said electric vehicle supply equipment.

10. The monitoring system of claim 9 wherein said control monitoring circuit is structured to isolate said monitoring system from said electric vehicle supply equipment.

11. The monitoring system of claim 1 wherein said monitoring component comprises a current sensor structured to sense current flowing between said electric vehicle supply equipment and said electric vehicle, and a voltage sensor structured to sense a voltage output from said electric vehicle supply equipment to said electric vehicle.

12. The monitoring system of claim 11 wherein said current sensor and said voltage sensor are both structured to isolate said monitoring system from said electric vehicle supply equipment and said electric vehicle.

13. The monitoring system of claim 1 wherein said power supply is an uninterruptible power supply.

14. The monitoring system of claim 1 wherein said monitoring component is structured to isolate said monitoring system from said electric vehicle supply equipment and said electric vehicle.

15. The monitoring system of claim 1 wherein said power supply is further structured to power said monitoring system from a battery or a power input independent from said electric vehicle supply equipment and said electric vehicle.

16. A method of monitoring an electric vehicle and an electric vehicle supply equipment structured to communicate with said electric vehicle to charge said electric vehicle, said method comprising:

monitoring with a processor two-way communication between said electric vehicle supply equipment and said electric vehicle and energy or power flow between said electric vehicle supply equipment and said electric vehicle; and storing information corresponding to said two-way communication and said energy or power flow between said electric vehicle supply equipment and said electric vehicle.

17. The method of claim 16 further comprising:

time-stamping events corresponding to said two-way communication and said energy or power flow between said electric vehicle supply equipment and said electric vehicle; and storing said time-stamped events.

18. The method of claim 17 further comprising:

outputting a sequence of events of said stored time-stamped events.

19. The method of claim 16 further comprising:

including with said stored information sensed current flowing between said electric vehicle supply equipment and said electric vehicle, sensed voltage output from said electric vehicle supply equipment to said electric vehicle, sensed current flowing to said electric vehicle supply equipment from a power source, and sensed voltage to said electric vehicle supply equipment from said power source.

20. The method of claim 16 further comprising:

including with said stored information communication commands from said electric vehicle to said electric vehicle supply equipment, and communication responses from said electric vehicle supply equipment to said electric vehicle.

* * * * *